(12) United States Patent
Evevsky

(10) Patent No.: US 8,412,567 B2
(45) Date of Patent: Apr. 2, 2013

(54) SYSTEM AND METHOD FOR COMPUTERIZED SALES OPTIMIZATION

(75) Inventor: Nick Evevsky, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1201 days.

(21) Appl. No.: 12/045,943

(22) Filed: Mar. 11, 2008

(65) Prior Publication Data

US 2009/0234722 A1 Sep. 17, 2009

(51) Int. Cl.
*G06Q 40/00* (2006.01)
(52) U.S. Cl. .................. 705/14.1; 705/14.13; 705/14.38
(58) Field of Classification Search .................... 705/14, 705/14.1, 14.13, 14.38
See application file for complete search history.

(56) References Cited

U.S. PATENT DOCUMENTS

| | | | |
|---|---|---|---|
| 5,715,314 A | 2/1998 | Payne et al. | |
| 5,909,492 A | 6/1999 | Payne et al. | |
| 6,317,722 B1 * | 11/2001 | Jacobi et al. | 705/14.51 |
| 6,850,899 B1 | 2/2005 | Chow et al. | |
| 7,043,497 B1 | 5/2006 | Carty et al. | |
| 7,085,682 B1 | 8/2006 | Heller et al. | |
| 7,225,148 B2 | 5/2007 | Kassan | |
| 7,552,069 B2 * | 6/2009 | Kepecs | 705/14.25 |
| 7,980,466 B2 * | 7/2011 | Lee et al. | 235/383 |
| 2002/0107733 A1 * | 8/2002 | Liu et al. | 705/14 |
| 2003/0177066 A1 * | 9/2003 | Zhang et al. | 705/14 |
| 2005/0240474 A1 * | 10/2005 | Li | 705/14 |
| 2006/0212358 A1 * | 9/2006 | Walker et al. | 705/21 |
| 2008/0096650 A1 * | 4/2008 | Baerlocher | 463/30 |

OTHER PUBLICATIONS

Nach M. Maravilla; The Case of the Abandoned Shopping Carts; http://www.powerhomebiz.com/vol13/shoppingcarts/htm, date of search Feb. 4, 2008; Apr. 2007.
Nach M. Maravilla; How to Sell More on the Web: 30 Tips to Increase Conversion Rates for an Ecommerce Site; http://www.powerhomebiz.com/092006/ecommerce.htm, date of search Feb. 4, 2008: Sep. 2006.
Nach M. Maravilla; How to Sell More on the Web: Get the Right Traffic; http://www.powerhomebiz.com/092006/ecommerce-traffic.htm, date of search Feb. 4, 2008; Sep. 2006.
Nach M. Maravilla; How to Sell More on the Web: Build Customer Confidence; http://www.powerhomebiz.com/092006/ecommerce-confidence.htm, date of search Feb. 4, 2008; Sep. 2006.

(Continued)

*Primary Examiner* — Jagdish Patel
*Assistant Examiner* — Kevin Poe
(74) *Attorney, Agent, or Firm* — MH2 Technology Law Group LLP

(57) ABSTRACT

Disclosed is a method for increasing the conversion rate, or the ratio of the number of actual buyers to the number of site visitors, of an computer-implemented system such as an Internet e-commerce website. Shopping cart abandonment may be reduced though the disclosed method wherein filler items are suggested to the consumer in order to qualify the consumer for a promotional bonus, such as free shipping. By simplifying the consumer's task of selecting filler items, the consumer may be more likely to consummate the sale instead of abandoning the shopping cart to find a better deal elsewhere. In the event no suitable filler items can be identified, alternative promotions may be presented to the consumer, for example, reduced rate shipping.

21 Claims, 6 Drawing Sheets

OTHER PUBLICATIONS

Nach M. Maravilla; How to Sell More on the Web; Inprove Product Presentation; http://www.powerhomebiz.com/092006/ecommerce-product.htm, date of search Feb. 4, 2008; Sep. 2006.

Nach M. Maravilla; How to Sell More on the Web: Maximize After-Sales Opportunities; http://www.powerhomebiz.com/092006/ecommerce-aftersales.htm, date of search Feb. 4, 2008; Sep. 2006.

Michael Bloch; Shopping cart abandonment: How to minimize orphaned carts; http://www.tamingthebeach.net/article4/cart-abandonment.htm, date of search Feb. 4, 2008; 1999-2007; Adelaide, South Australia.

* cited by examiner

SYSTEM AND METHOD FOR COMPUTERIZED SALES OPTIMIZATION

BACKGROUND

The present disclosure relates to the field of computer data processing, and more particularly, to a system and method for increasing the conversion rate of a computerized sales system such as an e-commerce website.

Online shopping, or e-commerce, has enjoyed unprecedented growth in recent years, with consumers spending hundreds of billions of dollars annually on online purchases. An endless variety of goods and services are now available for purchase online, such as, for example, hard goods, soft goods, foodstuffs, and digital media. To make an online purchase, a consumer will typically use an access device, such as a personal computer or mobile wireless device. The consumer access device may run a web browser, such as Mozilla Firefox or Internet Explorer, for accessing a merchant's e-commerce website via a data network, such as the Internet. Upon accessing an e-commerce website, a consumer is generally presented with a variety of product offerings, which may include a textual description of a product, as well as representative photographs, videos and sounds related to the product. Often, the e-commerce website will provide directory and search functions to allow the consumer to quickly find desired items based upon keywords, manufacturer, model number, and the like. One or more items offered for sale may be presented on a web page. Additionally, an e-commerce website will often provide a shopping cart, which is a list of items the consumer has selected for purchase. An c-commerce site will often extend conditional promotions to the consumer, for example, free shipping with the purchase of one or more items whose total purchase price meets a certain condition, such as exceeding a threshold amount, i.e., fifty dollars. Such a conditional promotion may be said to be a "threshold promotion."

To select a product for purchase, the consumer will typically click on a link provided on the web page, which causes an entry corresponding to the item to be added to the shopping cart. The consumer may proceed to add additional items to shopping cart, modify existing items in the shopping cart, or delete existing items in the shopping cart. After the consumer is satisfied with the shopping cart selections, the consumer may finalize the order. During finalization, or "checkout", the consumer is typically provided with the item subtotal cost, shipping cost, sales tax if applicable, and the total cost of the order. Additionally, the e-commerce site may solicit from the consumer additional information necessary to complete the transaction, such as name, shipping address, billing address, email address, telephone number, and credit card or other payment information. Once the requested information has been provided, the consumer may be given an opportunity to review the order, and finally, consummate the transaction by clicking on a link, such as a "submit my order" or "buy" link, which causes the shopping cart and associated consumer information to be accepted as an order, effectuates the sale, and processes the order for fulfillment. The percentage of e-commerce website visitors who ultimately make a purchase is said to be the "conversion rate" of that website. For example, if two hundred consumers visit a website and ten of those consumers make a purchase, the conversion rate would be five percent.

However, many times a consumer will proceed through an online purchase process yet fail to consummate the transaction, essentially abandoning the shopping cart. In a common scenario, a consumer will add the desired items to the shopping cart, and initiate the checkout process in order to get a true indication of the total purchase cost, including shipping and tax. If the merchant has extended a threshold promotion which requires some minimum purchase amount, the consumer may begin the checkout process to determine whether the order qualifies for the promotional offer. For example, a consumer will go through the process of purchasing items to see whether free shipping will be offered. If the order does not meet the promotional threshold, the consumer may need to hunt for additional items on the merchant's website in order to meet the promotional threshold, an onerous distraction which can cause the sale to be lost. Often the consumer will simply abandon the shopping cart and perhaps visit another online merchant in an attempt to find a better deal.

Consumer abandonment, or shopping cart abandonment, is a matter of serious concern to online merchants. By some estimates shopping cart abandonment causes over sixty percent of potential online sales to be lost. It would greatly benefit online merchants to reduce the number of shopping carts abandoned on their e-commerce websites, and to convert those potentially lost buyers into paying customers.

SUMMARY

The present disclosure is directed to an online shopping system and method which increases the conversion rate of an e-commerce website by reducing the incidence of shopping cart abandonment. In an envisioned embodiment, an e-commerce website having a conditional promotion is provided, wherein a bonus (i.e., free shipping) is awarded to the consumer if the total value of the order exceeds a preset threshold value (i.e., fifty dollars). Initially, the consumer may add primary items, or those items expressing the consumer's initial or primary purchasing intention, to the shopping cart. As additional items are added to the shopping cart, a shopping cart filler item module may cause to be presented to the consumer one or more filler items, each having a price which, for example, is at least the difference between the sum of the prices of items currently in the shopping cart (i.e., the order subtotal) and the promotional threshold such that, if purchased, would qualify the consumer's order for the promotional offer. As the consumer adds further items to the shopping cart, and if the order total still does not meet the promotional threshold, alternative filler items may be suggested to the consumer in the same manner, until the promotional threshold is reached, or until the consumer proceeds to checkout without having reached the promotional threshold.

In an embodiment envisioned within the scope of the present disclosure, once the consumer has proceeded to checkout, a checkout filler item module may cause to be presented to the consumer one or more filler items, each having a price which, for example, is at least the difference between the sum of the prices of items currently in the shopping cart (i.e., the order subtotal) and the promotional threshold such that, if purchased, would qualify the consumer's order for the promotional offer.

In embodiments according to the present disclosure, additional or alternative promotions or incentives may be offered to the consumer when certain conditions are met. In an embodiment, if the consumer proceeds to the checkout process with a shopping cart having a total value which does not qualify for a threshold promotion, a checkout filler item module may cause to be presented to the consumer an alternative incentive to consummate the order, for example, a reduced shipping fee. In an embodiment, a tiered threshold promotion may be offered to the consumer whereby the purchase of additional items beyond those which qualified for the first threshold promotion will qualify the consumer to receive a second threshold promotion. As an example only, a consumer who places a total of at least fifty dollars worth of goods into the shopping cart may receive free shipping, yet if the consumer then continues to place additional items into the shopping cart, thereby bringing the total to at least one hundred dollars, the consumer may receive free expedited (next-day) shipping.

In an embodiment according to the present disclosure, the e-commerce website includes a database which may contain information related to the merchant's products and the consumer's transaction history and preferences. A filler item identification module is provided wherein the total price of those items currently in the shopping cart is evaluated. If the total price is less than the threshold (minimum) value, the minimum extra purchase amount needed to qualify for the threshold promotion is computed. The merchant's product database may then be queried to identify items having a selling price greater than the minimum extra purchase amount. Additionally or alternatively, the items may be identified and/or ranked in accordance with a filler item item priority. In one exemplary embodiment, the filler item priority may be ranked, from highest to lowest: 1) whether the item is a member of a favorite product list maintained by the consumer (i.e., a "wish" list or a "shopping" list); 2) whether the item is similar or related to items previously purchased by the consumer (i.e., similar or related merchandise class, department, color, style, size, technology, artist, brand, and the like); and/or 3) whether the item is currently a promotional item (i.e., currently "on sale" or offered at a reduced price, overstock items, slow movers, clearance items, and the like). It should be understood that the aforesaid filler item priorities are representative and not limiting, and additional or alternative filler item priorities and ordering are envisioned within the scope of the present disclosure. For example, seasonal or holidays items may be assigned a higher or lower priority, or excluded from being considered as a filler item, depending on such criteria as the calendar day.

Embodiments are envisioned wherein, for example, a first-time visitor to an e-commerce website, i.e., a consumer who has, for example, never browsed the e-commerce website and/or has never made a purchase from the e-commerce website, are identified. Identification of such first-time visitors may be achieved by any suitable means, for example, by cookie (or absence of a cookie), and/or the visitor's IP address. Additional or alternative offers may be extended to first-time visitors, for example, a free gift or a reduced threshold offer. For example, whereas a non first-time visitor may receive free shipping with a fifty dollar purchase, a first-time visitor may receive free shipping with a twenty-five dollar purchase.

Any items thus identified which meet the described criteria may be presented to the user as an inducement to make additional purchases in order to qualify for the threshold promotional offer. In this manner, the consumer benefits by being relieved of the burden of hunting for additional items in order to qualify for the promotion, which may overcome the consumer's resistance to making the purchase. Benefits accrue to the merchant as well, because by presenting the consumer with additional item choices that are tailored to the consumer's needs within the current shopping session, the consumer may be less inclined to abandon the shopping cart and instead, make a purchase.

In an embodiment, the consumer may optionally choose to see additional or alternative filler items in event that, for example, the present set of filler items is not to the consumer's liking. It is envisioned that the first set of filler items are presented in priority order, for example, the first set of n filler items presented to the consumer will be the n highest-priority filler items identified. If the consumer chooses to see additional filler items, the n next-highest filler items are presented, and so forth until no more suitable filler items can be identified.

In the event no filler items can be identified which meet the described criteria, the consumer may be presented with an alternative bonus offer in order to induce the consumer to consummate the purchase despite not having selected items sufficient to meet the threshold promotion. Such alternative offers may include without limitation offering a reduced shipping rate, offering a discount on one or more of the selected items, offering a discount or credit towards future purchases (i.e., a coupon), or offering a complimentary item. In one embodiment envisioned within the present disclosure, the amount of discount or nature of coupon offered is correlated to the value of the currently selected items, consumer information (i.e. purchasing history or wish list items), and/or merchant information (i.e., promotional or clearance items).

In accordance with the present disclosure, in the event no filler items can be identified which meet the described criteria, an interactive communication session may be established between the consumer and the merchant, such as without limitation, a chat session, a telephonic (audio) session, or a videotelephonic session. The communication session may be initiated by the customer or by the merchant.

In yet another embodiment contemplated within the present disclosure, a filler item may be presented as a mystery item, wherein the actual product description is concealed until some future time. The mystery item may have an actual value greater than, less than, or equal to the price at which it is offered. In one aspect, the price of the mystery items is equal to or greater than the difference between the order subtotal and the promotional threshold. The identity of the mystery item may be revealed to the consumer after the mystery item is added to the shopping cart, after the order is consummated, after the item is delivered to the consumer, or at a predetermined time (i.e., a consumer's birthday or a holiday).

The present disclosure also provides a computer-readable medium storing a set of programmable instructions configured for being executed by at least one processor for performing a method of presenting filler items to a consumer in accordance with the present disclosure.

BRIEF DESCRIPTION OF THE DRAWINGS

Various embodiments of the present disclosure will be described herein below with reference to the figures wherein.

DETAILED DESCRIPTION

The present disclosure provides an online shopping system and method which increases the conversion rate of an e-commerce website by reducing the incidence of shopping cart abandonment, which is now described in detail with reference to the Figures. It is to be understood and appreciated the herein description is meant to illustrate, and not limit, the scope of the present disclosure. As used throughout this disclosure, the term "product" is to be construed to mean a deliverable product (i.e., physical product, downloadable media, and the like) except when used in an arithmetical context whereupon "product" is to be construed to have its ordinary meaning (i.e., the result of an arithmetic multiplication). As used throughout this disclosure, the term "item" is to be construed to mean a symbolic representation of product (i.e., a database entry of corresponding to a product or a representation of the product in a shopping cart).

Figure 1:
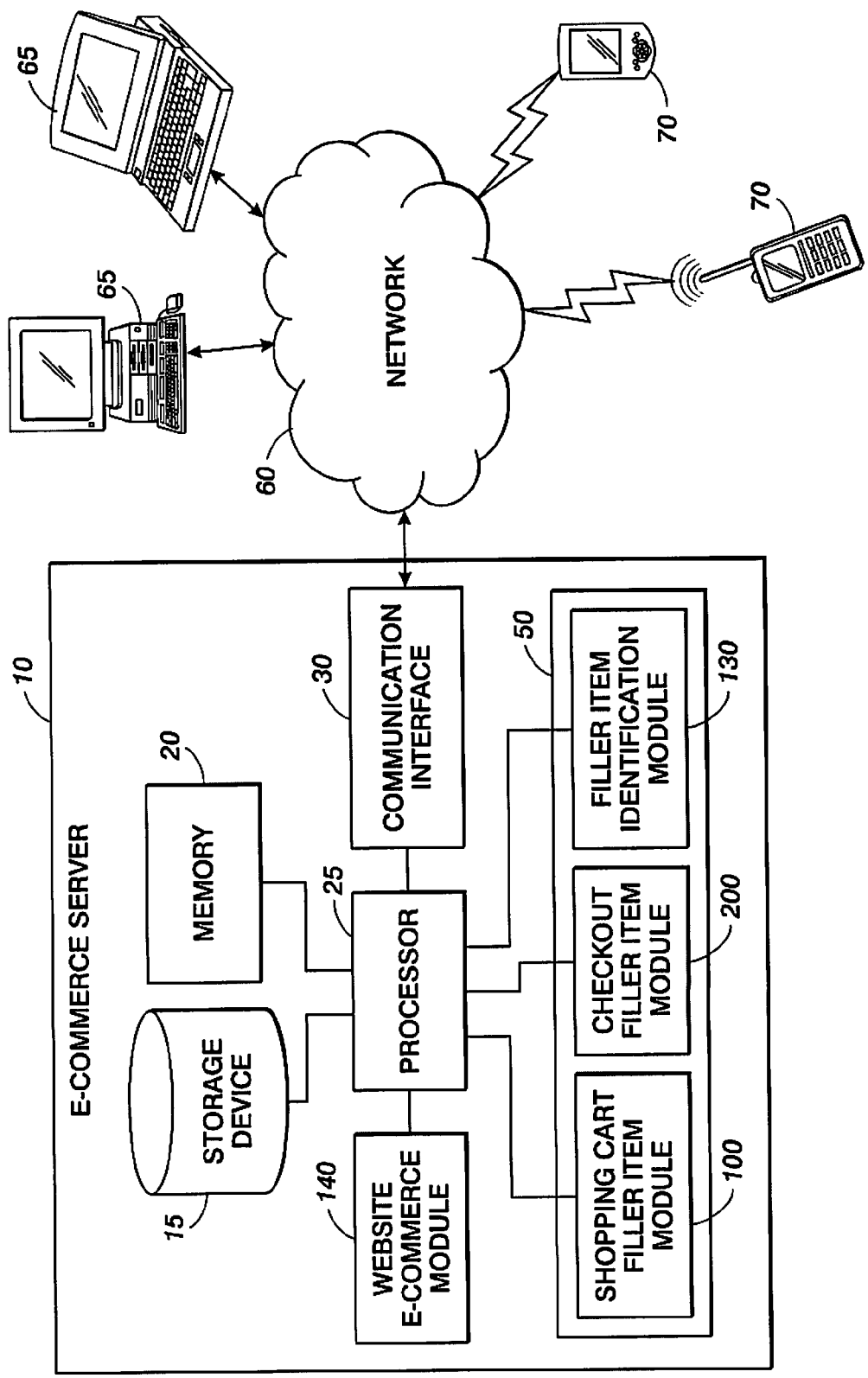
FIG. 1 is a block diagram of an exemplary e-commerce system in accordance with the present disclosure.

FIG. 1 illustrates an exemplary e-commerce server 10 embodying aspects of the present disclosure. The e-commerce server 10 includes at least one processor 25 that is operatively coupled, by system bus or other suitable means, to storage device 15, memory 20, and communications interface 30. Communications interface 30 is operatively coupled to consumer access devices, which may include without limitation a personal computer 65 and/or wireless device 70, via a data network 60, such as the Internet, as is well-known in the art. In an embodiment, communications interface 30 may be a wired network interface such as a 100Base-T Fast Ethernet interface, or a wireless network interface such as a wireless network interface compliant with the IEEE 802.11 ("WiFi") standard.

E-commerce server 10 may include a merchant item database (not shown) for storing data related to the items the merchant may offer for sale, a consumer favorite products list (not shown), and/or a record of a consumer's purchase history. E-commerce server 10 may also provide an online shopping cart for enabling a consumer to select items for purchase, as is well-known.

E-commerce server 10 further includes a filler item processing module 50 having at least one of software, firmware and hardware for evaluating the value of items in a shopping cart and suggesting filler items in accordance with the present disclosure. In one embodiment, the filler item processing module 50 includes a shopping cart filler item module 100, a checkout filler item module 200, and a filler item identification module 300. Shopping cart filler item module 100 includes a software program having a set of programmable instructions configured for execution by the at least one processor 25 of the e-commerce server 100 for presenting filler items to a consumer when the shopping cart is modified, i.e., at least one item is added, changed, or deleted from the shopping cart. Checkout filler item module 200 includes a software program having a set of programmable instructions configured for execution by the at least one processor 25 of the e-commerce server 100 for presenting filler items and/or alternative offers to a consumer during the checkout process. Filler item identification module 300 includes a software program having a set of programmable instructions configured for execution by the at least one processor 25 of the e-commerce server 100 for identifying filler items that may be offered to a consumer. In an envisioned embodiment of present disclosure, the filler item processing module 50 implementing the algorithms disclosed herein is contained within a software extension component, such as a script, macro, dynamic link library (DLL), plug-in or snap-in, that extends the capabilities of a website e-commerce module 140, such as without limitation, Microsoft Commerce Server™, Adobe ColdFusion™, or Apache or other web server in an e-commerce configuration. In another embodiment contemplated by the present disclosure, filler item processing module 50 implementing the algorithms disclosed herein is incorporated within the website e-commerce module 140.

Figure 2:
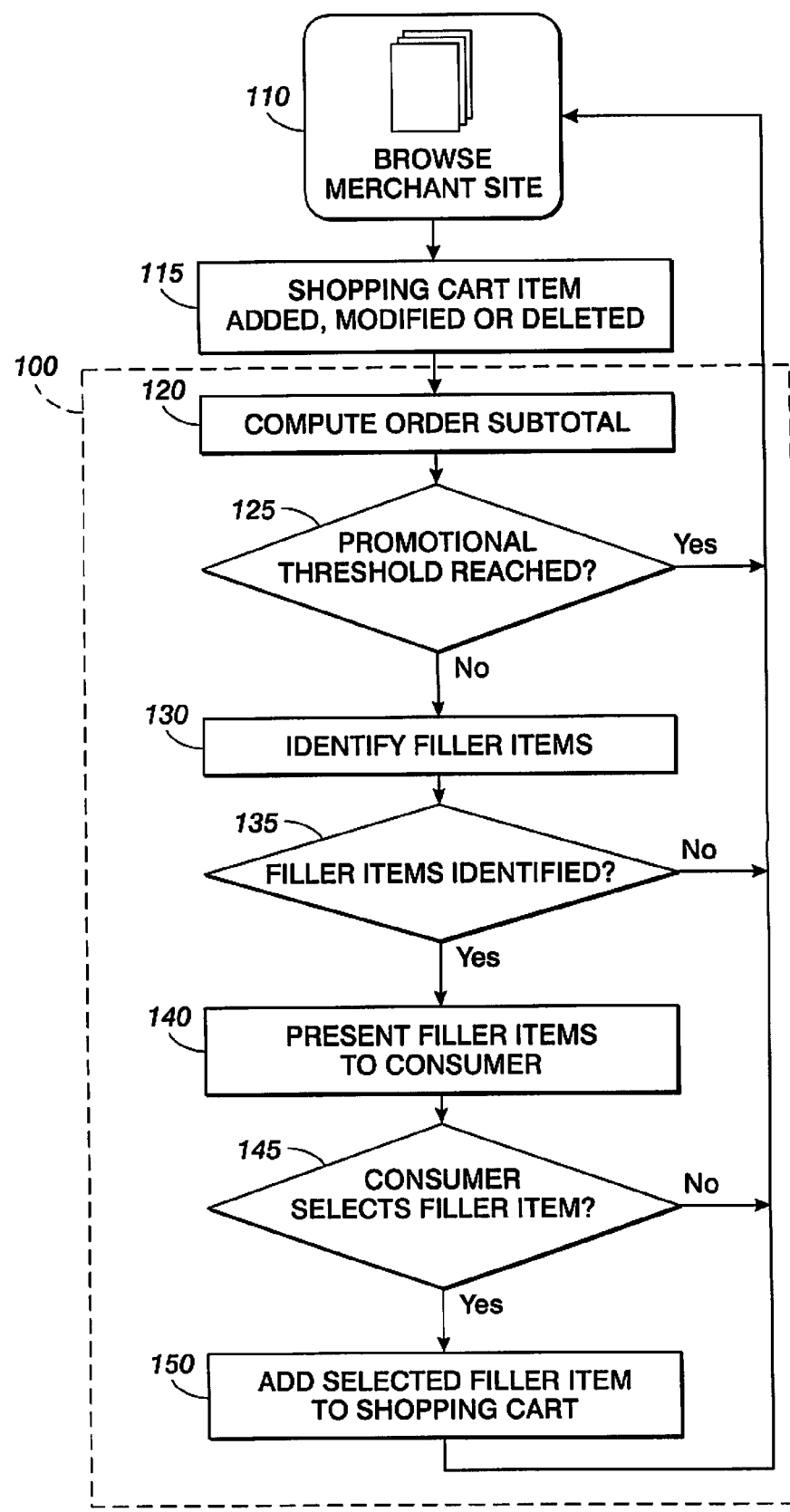
FIG. 2 is a flow diagram of a shopping cart optimization module in accordance with the present disclosure.

With reference to FIG. 2, an embodiment of the shopping cart filler item module 100 is presented in accordance with the present disclosure. It is to be understood that the labels and symbols used throughout this disclosure are illustrative in nature, and are not to be construed as limiting the scope of the present disclosure. In the step 110 the consumer browses, or "shops" the merchant site, to select item(s) for purchase. Upon selection the items may be added to the shopping cart in the step 115. Alternatively, in the step 115 an existing item in the shopping cart may be modified, i.e., the desired quantity may be changed, or an existing item in the shopping cart may be deleted. The product of the unit price and corresponding quantity of each item is summed in the step 120 to cumulatively compute the order subtotal. In the step 125 the order subtotal is compared to the promotional threshold amount. If the promotional threshold has been reached, i.e., the order total is equal to or greater than the promotional threshold, the shopping cart filler item module 100 processing is concluded and the consumer is returned to the browsing state 110. However, if the promotional threshold has not been reached, the step 130 is performed wherein filler items are identified by the filler item identification module 300, as will be described in detail hereinbelow. If no filler items are identified, the shopping cart filler item module 100 processing is concluded and the consumer is returned to the browsing state 10. However, if filler items have been found, the step 140 is performed wherein the filler items are presented to the consumer for purchase. In the step 145 it is determined whether the consumer has chosen a filler items. If no item was selected, the consumer is returned to the browsing state 110. If an item was selected, the item is added to the shopping cart in the step 150 and the consumer is returned to the browsing state 10.

Figure 3:
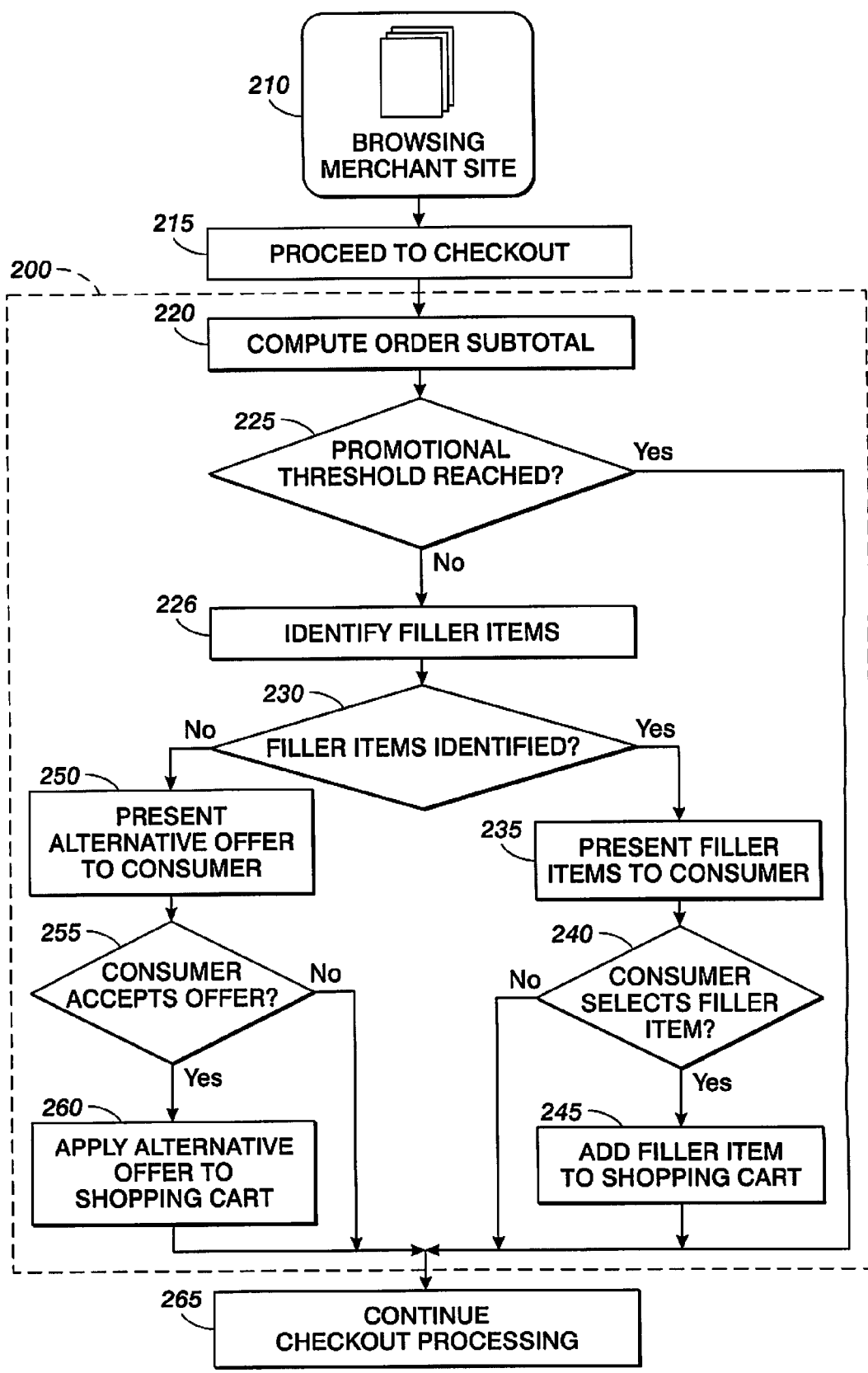
FIG. 3 is a flow diagram of a checkout filler item module in accordance with the present disclosure.

Turning now to FIG. 3, an embodiment of the checkout filler item module 200 is presented in accordance with the present disclosure. In the step 210 the consumer may browse or "shop" the merchant and ultimately in the step 215 proceed to checkout. The product of the unit price and corresponding quantity of each item is summed in the step 220 to cumulatively compute the order subtotal. In the step 225 the order subtotal is compared to the promotional threshold amount. If the promotional threshold has been reached, i.e., the order total is equal to or greater than the promotional threshold, the checkout filler item module 200 processing is concluded and the checkout process continues, i.e., the consumer may supply to the merchant site shipping, billing and other necessary information to complete the transaction. However, if the promotional threshold has not been reached, the step 228 is performed wherein filler items are identified by the filler item identification module 300, as will be described in detail hereinbelow.

If no filler items are identified, the step 250 is performed wherein an alternative offer is presented to the consumer, for example, reduced cost shipping. In the step 255 it is determined whether the consumer has accepted the order. If the consumer rejected the alternative offer, the checkout filler item module 200 processing is concluded and the checkout process continues. Conversely, if the consumer accepted the alternative offer, the alternative offer is applied to the shopping cart in the step 260, and thereafter checkout filler item module 200 concludes and checkout continues.

If, however, filler items are identified, the step 235 is performed wherein the filler items are presented to the consumer for purchase. In the step 240 it is determined whether the consumer has chosen a filler items. If no item was chosen, checkout filler item module 200 processing concludes and checkout continues. If an item was chosen, the item is added to the shopping cart in the step 245, and checkout filler item module 200 processing concludes and checkout continues.

In another envisioned embodiment, only certain items corresponding to a predetermined criteria, i.e., only items from a particular manufacturer or of a particular type, are considered in an order subtotal calculation. In this manner, a promotion such as "Buy one hundred dollars worth of Xerox toner and receive free shipping" could be achieved.

Figure 4:
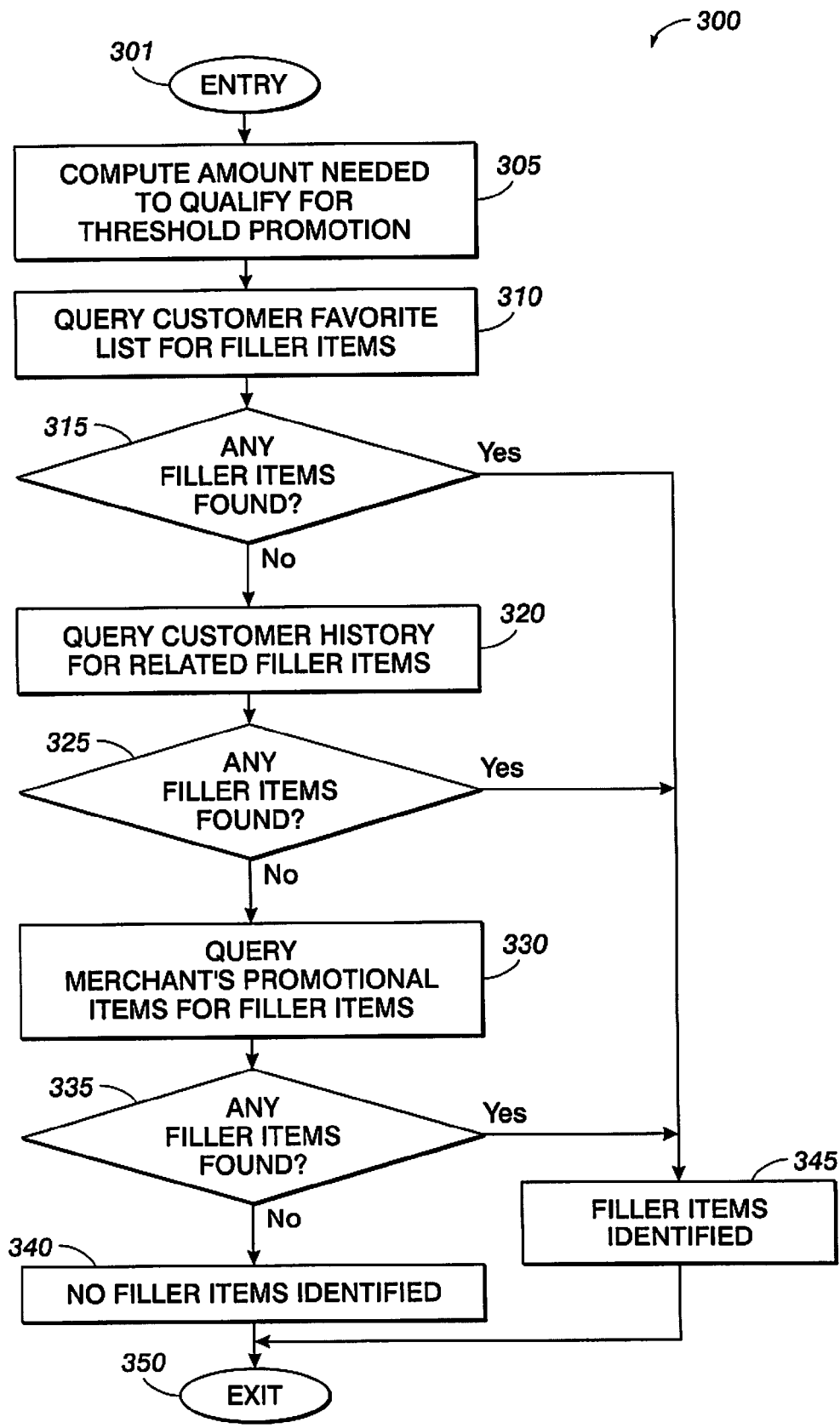
FIG. 4 is a flow diagram of a filler item identification module in accordance with the present disclosure.

Referring now to FIG. 4, the filler item identification module 300 is described. In the step 305, a qualification amount needed to qualify the consumer's order is computed by subtracting the order subtotal (previously described) from the promotional threshold amount. In the step 310, the consumer's favorite product list may be examined to identify which, if any, of the consumer's favorite products have a price that equals or exceeds the qualification amount. The list may be examined any suitable means, including without limitation a database query, an indexed lookup, or a sequential search. In the step 315 it is determined whether any filler items were identified in the consumer's favorite product list and if so, the filler items are processed for presentation to the consumer. In an embodiment, the identified filler items are caused to be conveyed to a calling module (i.e., the module which requested identification of filler items) such as a shopping cart filler item module 100 or checkout filler item module 200. Having successfully identified filler items in the consumer's favorite product list, the filler item identification module 300 concludes (step 350).

If no filler items were identified in the consumer's favorite product list, the step 320 is performed wherein a consumer's purchase history may be examined to correlate types of items the consumer has purchased in the past with items in a merchant item database (i.e. items which are offered for sale by the merchant). In an embodiment, the consumer's purchase history may include the items currently in the consumer's shopping cart. Those items in the merchant item database which are similar to items in the customer's purchase history are identified as potential filler items. As an example only, purchase history items may be correlated to merchant database items on any of merchandise class, department, color, style, size, technology, artist, brand, and/or manufacturer. Any potential filler items thus identified are then further examined to determine which, if any, potential filler items having a price that equals or exceeds the qualification amount. Those items which have a price equaling or exceeding the qualification amount are identified as filler items. In the step 325 it is determined whether any filler items were identified and if so, the filler items are processed for presentation to the consumer as previously described herein, and the filler item identification module 300 concludes (step 350).

If no filler items were identified which correlate to the consumer's purchasing history, the step 330 is performed wherein a merchant database may be examined to identify which, if any, of the items which are offered for sale by the merchant have a price that equals or exceeds the qualification amount. In an embodiment, the identified merchant database items may be ranked in accordance with a predetermined priority, such as items currently "on sale" (i.e., currently offered at a reduced price), overstock items, slow moving inventory, and/or clearance items. Higher-ranked items may then be presented to the consumer before lower-ranked items. The ranking order may be determined by the merchant to, for example, help achieve the merchant's business objectives (i.e., reduce inventory on slow moving or overstock items, promotes particular brands, and the like). In the step 335 it is determined whether any filler items were identified and if so, the filler items are processed for presentation to the consumer as previously described herein, and the filler item identification module 300 concludes (step 350). Otherwise, no filler items could be identified by the filler item identification module 300. In an embodiment, the fact that no filler items were identified is caused to be conveyed to a calling module (i.e., the module which requested identification of filler items) such as a shopping cart filler item module 100 or checkout filler item module 200. Filler item identification module 300 then concludes (step 350).

Other methods of identifying filler items are contemplated with the scope of the present disclosure, for example, choosing a filler item from a list of at least one predetermined filler item.

Figure 5:
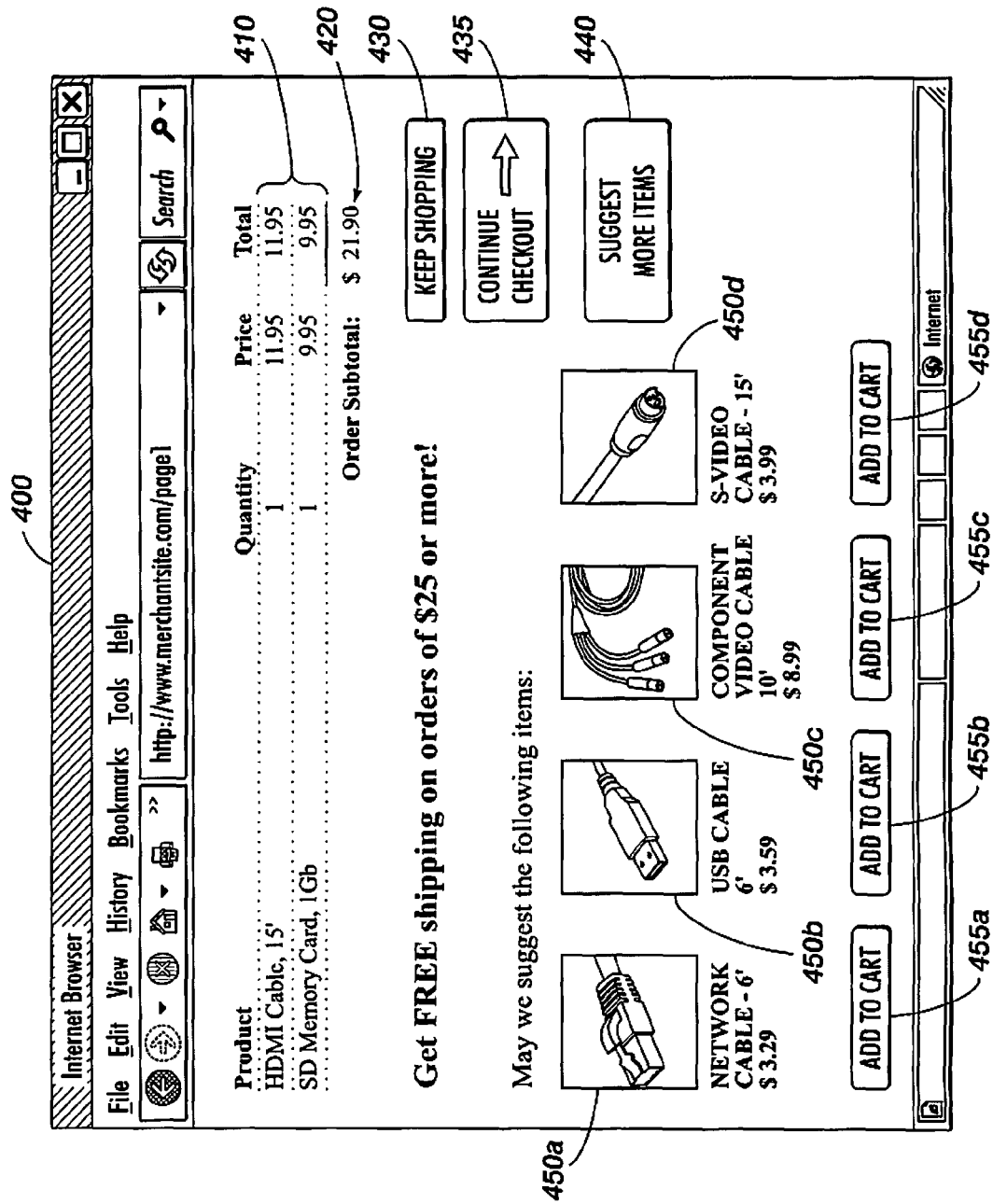
FIG. 5 is an exemplary schematic of a web page presenting filler items to the consumer in accordance with the present disclosure.
Figure 6:
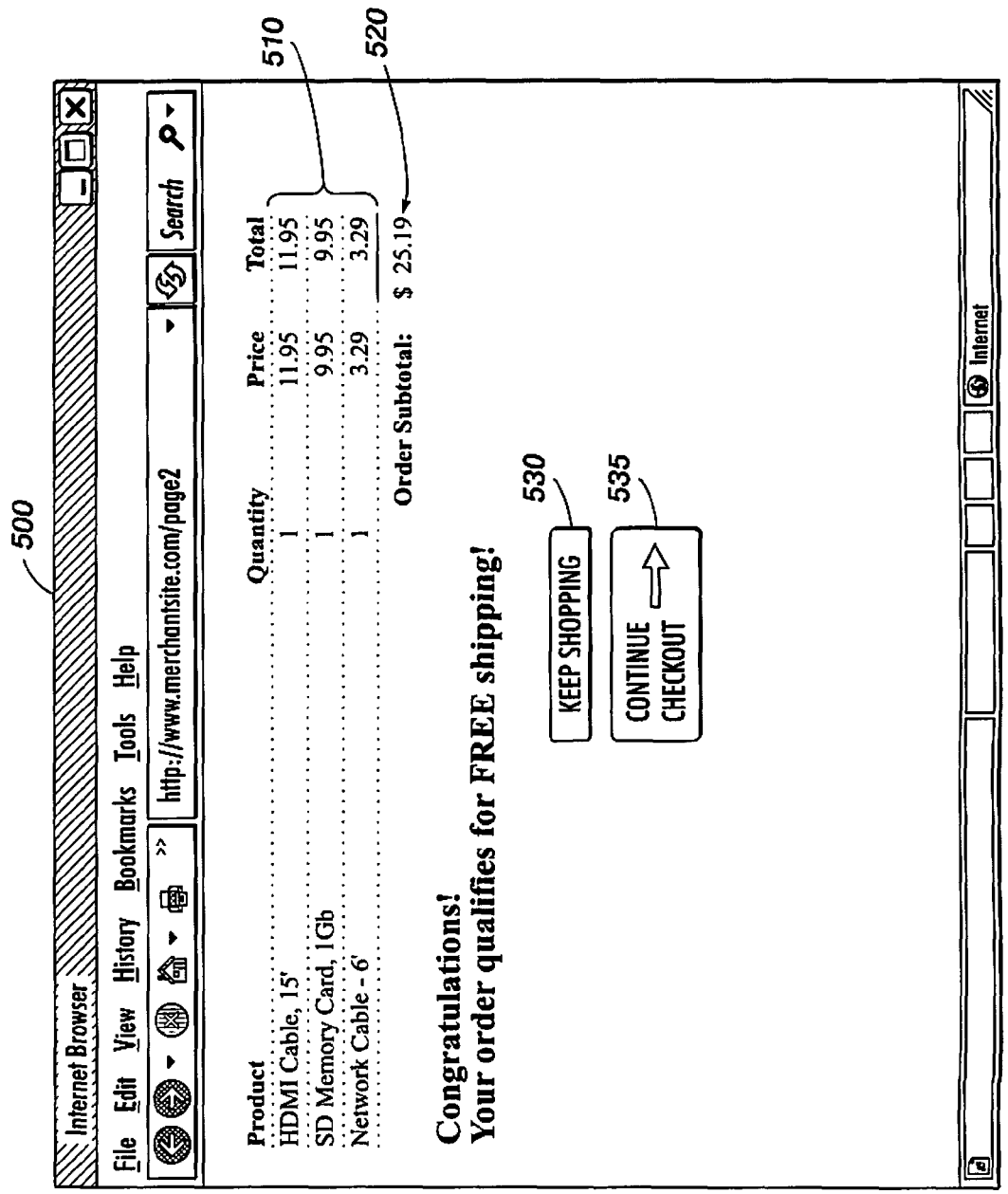
FIG. 6 is an exemplary schematic of a web page after a consumer has selected a filler item in accordance with the present disclosure.

In FIGS. 5 and 6 there is shown exemplary web pages illustrating a shopping cart presentation of filler items to the consumer, and the shopping cart after the consumer has selected a filler item, respectively. In FIG. 4 the consumer has previously added the items 410 to the cart, having a subtotal 420. Filler items 450a-d are presented to the consumer in accordance with the method disclosed herein. The consumer may select a filler item 450a-d by causing to be activated a corresponding "add to cart" button 455a-d. Alternatively, the consumer may choose to view additional or alternative filler items by causing to be activated a "suggest more items" button 440. Alternatively, the consumer may choose to keep shopping the merchant site by causing to be activated a "keep shopping" button 430, or, continue to checkout by causing to be activated a "continue checkout" button 435. In FIG. 6, the consumer has selected filler item 450a which has been added to the cart 510 having a subtotal 520. The consumer may choose to keep shopping the merchant site by causing to be activated a "keep shopping" button 530, or, continue to checkout by causing to be activated a "continue checkout" button 535.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software, or a combination thereof.

What is claimed is:

1. A method of implementing an electronic commerce shopping cart, comprising:

identifying one or more items selected for purchase by a user in an electronic shopping cart;

calculating a subtotal associated with the one or more items selected for purchase;

determining that the subtotal is less than a threshold associated with a promotional offer;

identifying, using a processor, a first group of filler items available for purchase in response to determining that the subtotal is less than the threshold, wherein one or more filler items in the first group of filler items have a price that is greater than or equal to a difference between the threshold and the subtotal;

presenting the first group of filler items to the user as optional items to add to the shopping cart to obtain the promotional offer;

receiving an indication that the user has elected to be presented with a second group of filler items, wherein one or more filler items in the second group of filler items have a price that is greater than or equal to the difference between the threshold and the subtotal; and in response to receiving the indication, presenting the second group of filler items to the user as optional items to add to the shopping cart to obtain the promotional offer.

2. The method of claim 1, further comprising:
identifying the first group of filler items in response to the user adding an item to the shopping cart.

3. The method of claim 1, further comprising:
identifying the first group of filler items in response to the user initiating a checkout operation to purchase the one or more items selected for purchase.

4. The method of claim 1, further comprising:
receiving an indication that the user has selected one or more filler items for purchase from among the first group of filler items or the second group of filler items; and
applying a promotion associated with the promotional offer in response to receiving the indication that the user has selected the one or more filler items for purchase.

5. The method of claim 4, wherein applying the promotion comprises applying a free or reduced shipping rate to items in the shopping cart.

6. The method of claim 4, further comprising:
presenting an additional promotional offer to the user, wherein the additional promotional offer is associated with a second, greater threshold.

7. The method of claim 1, further comprising:
selecting one or more items from a wish list created by the user for inclusion into the first group of filler items or the second group of filler items.

8. The method of claim 1, further comprising:
selecting one or more items related to items previously purchased by the user for inclusion into the first group of filler items or the second group of filler items.

9. The method of claim 1, wherein the promotional offer is available only to first-time visitors.

10. The method of claim 1, further comprising:
identifying a failure of the user to select one or more filler items for purchase; and
presenting an alternative promotional offer to the user in response to identifying the failure.

11. A system for implementing an electronic commerce shopping cart, comprising:
a processing system comprising one or more processors; and
a memory system comprising one or more computer-readable media, wherein the one or more computer-readable media contain instructions that, when executed by the processing system, cause the processing system to perform operations comprising:
identifying one or more items selected for purchase by a user in an electronic shopping cart;
calculating a subtotal associated with the one or more items selected for purchase;
determining that the subtotal is less than a threshold associated with a promotional offer;
identifying a first group of filler items available for purchase in response to determining that the subtotal is less than the threshold, wherein one or more filler items in the first group of filler items have a price that is greater than or equal to a difference between the threshold and the subtotal;
presenting the first group of filler items to the user as optional items to add to the shopping cart to obtain the promotional offer;

receiving an indication that the user has elected to be presented with a second group of filler items, wherein one or more filler items in the second group of filler items have a price that is greater than or equal to the difference between the threshold and the subtotal; and in response to receiving the indication, presenting the second group of filler items to the user as optional items to add to the shopping cart to obtain the promotional offer.

12. The system of claim 11, the operations further comprising:
identifying the first group of filler items in response to the user adding an item to the shopping cart.

13. The system of claim 11, the operations further comprising:
identifying the first group of filler items in response to the user initiating a checkout operation to purchase the one or more items selected for purchase.

14. The system of claim 11, the operations further comprising:
receiving an indication that the user has selected one or more filler items for purchase from among the first group of filler items or the second group of filler items; and
applying a promotion associated with the promotional offer in response to receiving the indication that the user has selected the one or more filler items for purchase.

15. The system of claim 14, wherein applying the promotion comprises applying a free or reduced shipping rate to items in the shopping cart.

16. The system of claim 14, the operations further comprising:
presenting an additional promotional offer to the user, wherein the additional promotional offer is associated with a second, greater threshold.

17. The system of claim 11, the operations further comprising:
selecting one or more items from a wish list created by the user for inclusion into the first group of filler items or the second group of filler items.

18. The system of claim 11, the operations further comprising:
selecting one or more items related to items previously purchased by the user for inclusion into the first group of filler items or the second group of filler items.

19. The system of claim 11, wherein the promotional offer is available only to first-time visitors.

20. The system of claim 11, the operations further comprising:
identifying a failure of the user to select one or more filler items for purchase; and
presenting an alternative promotional offer to the user in response to identifying the failure.

21. A computer-readable medium tangibly embodying instructions for performing, by one or more processors, operations comprising:
identifying one or more items selected for purchase by a user in an electronic shopping cart;
calculating a subtotal associated with the one or more items selected for purchase;
determining that the subtotal is less than a threshold associated with a promotional offer;

identifying a first group of filler items available for purchase in response to determining that the subtotal is less than the threshold, wherein one or more filler items in the first group of filler items have a price that is greater than or equal to a difference between the threshold and the subtotal;

presenting the first group of filler items to the user as optional items to add to the shopping cart to obtain the promotional offer;

receiving an indication that the user has elected to be presented with a second group of filler items, wherein one or more filler items in the second group of filler items have a price that is greater than or equal to the difference between the threshold and the subtotal; and in response to receiving the indication, presenting the second group of filler items to the user as optional items to add to the shopping cart to obtain the promotional offer.

* * * * *